Dec. 27, 1966  R. B. SMITH  3,293,804
APPARATUS FOR SHARPENING OBLIQUELY BEVELED TOOL EDGES
Filed May 27, 1964  3 Sheets-Sheet 1

INVENTOR:
RICHARD B. SMITH

BY Parrat, Bell, Seltzer, Park & Heard.
ATTORNEYS

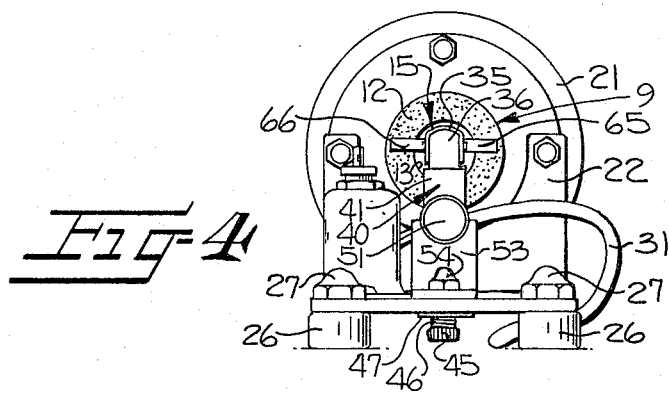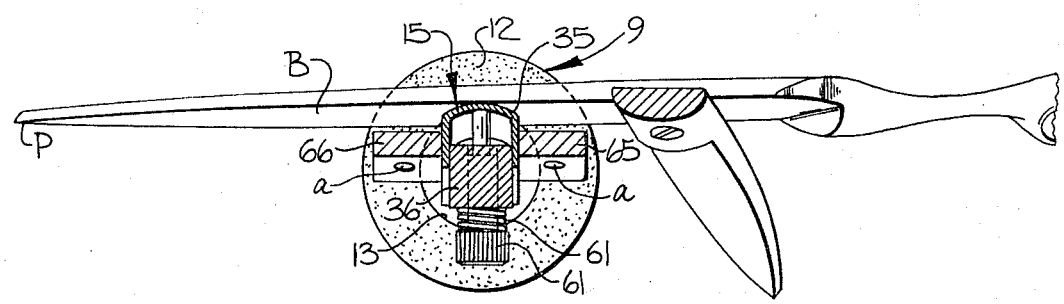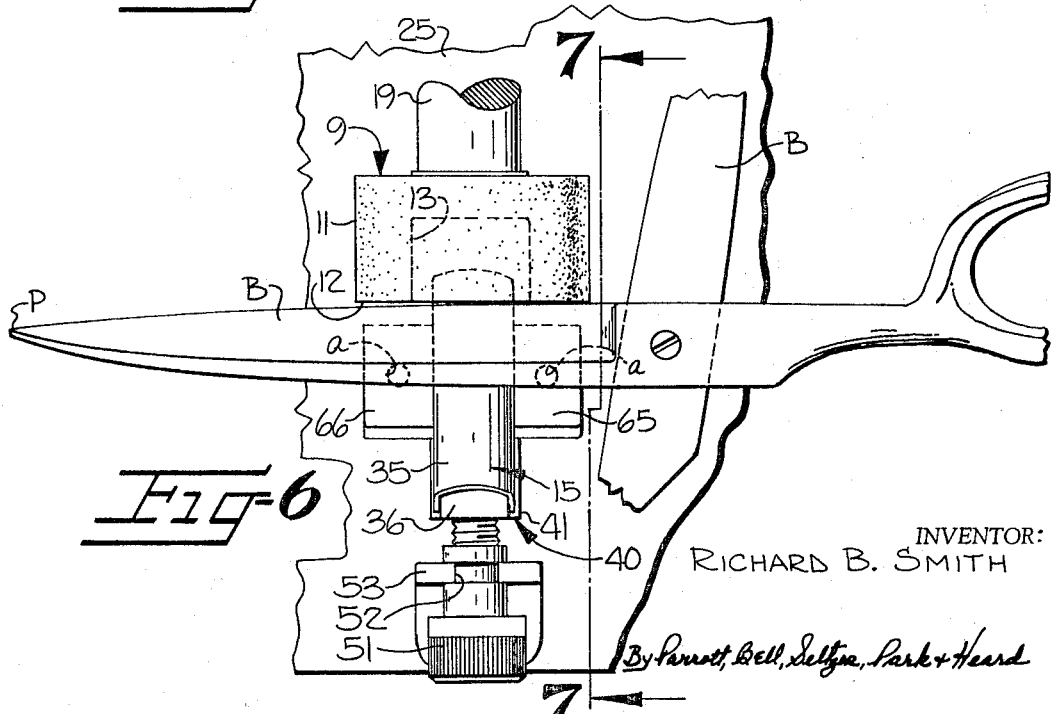

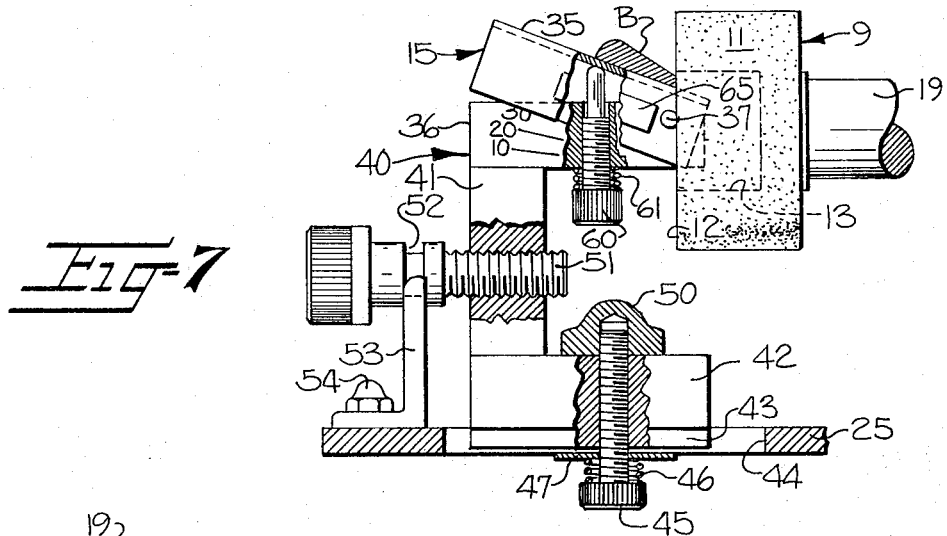
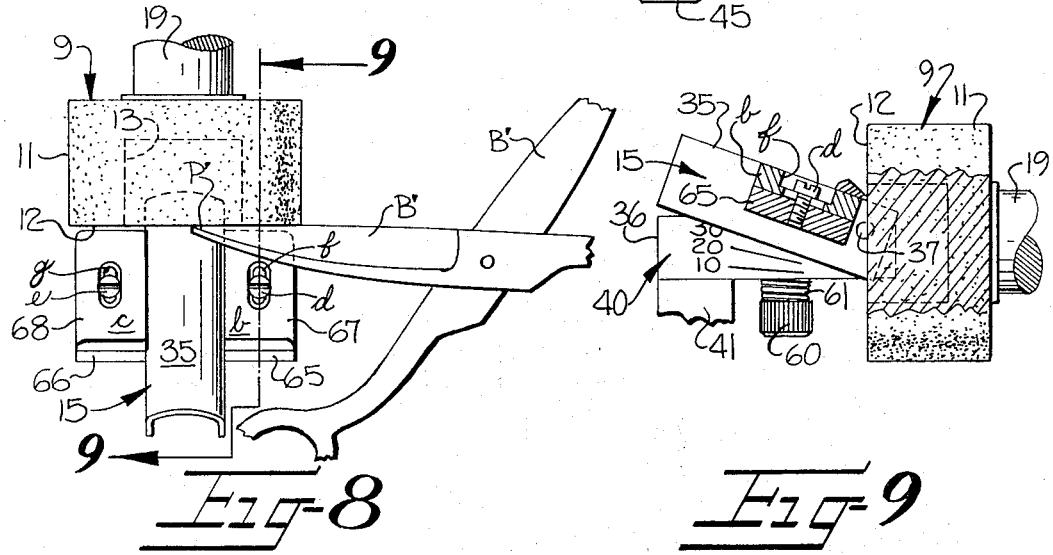
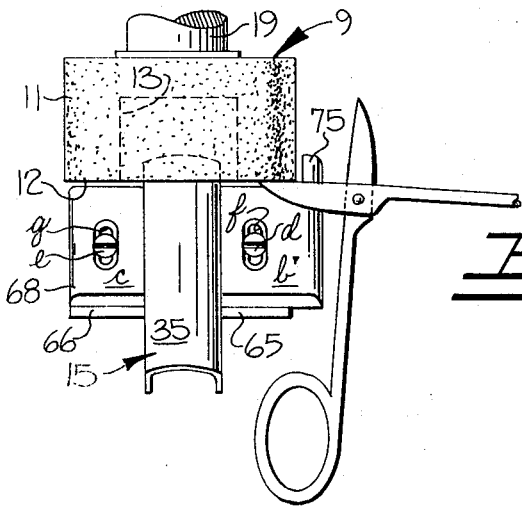
INVENTOR:
RICHARD B. SMITH
BY Parrott, Bell, Seltzer, Park & Heard
ATTORNEYS United States Patent Office 3,293,804
Patented Dec. 27, 1966

3,293,804
APPARATUS FOR SHARPENING OBLIQUELY
BEVELED TOOL EDGES
Richard B. Smith, P.O. Box 713, Hickory, N.C. 28601
Filed May 27, 1964, Ser. No. 370,415
9 Claims. (Cl. 51—128)

This invention relates to tool grinders and, more especially, to an apparatus for sharpening the obliquely beveled edges of scissors, tin snips, hedge clippers, grass clippers and other cutting implements without necessarily disassembling the same.

Heretofore, grinding devices for sharpening the blades of scissors and the like have not been satisfactory, particularly in instances wherein the blades are held in a person's hands during the sharpening process, because of difficulty in manipulating such blades as they are drawn across the blade rest. More importantly, the pointed free ends of such blades were not adequately supported while sharpening the same owing to the necessity of the blade rest being spaced from the abrasive surface of the grinding wheel.

It is therefore an object of this invention to provide a new and novel blade supporting means cooperating with a grinding wheel in a novel manner such that a uniformly beveled edge may be formed through the length of a manually manipulated blade even though such blade may have a sharply pointed free end and regardless of whether such blade is straight, curved, quite large or very small.

A more specific object is to provide a blade sharpening apparatus for bevel edged tools comprising a driven grinding wheel adapted to be positioned on a horizontal axis and including an annular portion having an annular outer end face defining a cavity therein within which one end portion of a blade rest having an elongate convex upper blade guiding surface is positioned and wherein said blade rest extends outwardly from within said cavity at a predetermined angle relative to the annular outer face of the grinding wheel such that the convex blade guiding surface of the rest and the outer face of the grinding wheel form opposed sides of a blade receiving pocket.

It is another object of this invention to provide a blade sharpening apparatus of the type described including means for relatively axially adjusting the blade rest and the grinding wheel to compensate for any wear of the outer end face thereof and whereby the convex upper surface of the blade rest may be positioned in close proximity to the inner peripheral edge of the annular end face of the grinding wheel without engaging the same.

Still another object is to provide means for effecting relative angular adjustment between the grinding wheel and the blade rest about a substantially lateral axis with respect to the axis of the grinding wheel, which lateral axis is located adjacent the annular end face of the grinding wheel, to thereby vary the angle between said annular end face and the convex upper surface of said blade rest and therefore the included angle between the opposed sides of the blade receiving pocket.

Some of the objects of the invention have been stated, other objects will appear as the description proceeds, when taken in connection with the accompanying drawings, in which:

FIGURE 4 is a front end elevation of the apparatus looking at the left-hand side of FIGURES 2 and 3, but showing the blade rest in substantially horizontal position;

FIGURE 5 is an enlarged vertical sectional view taken substantially along line 5—5 in FIGURE 2 showing one of the blades of a pair of scissors resting upon the blade rest and against the annular end face of the grinding wheel;

FIGURE 6 is a top plan view of the structure shown in FIGURE 5, but including additional details and showing the base of the apparatus broken away;

FIGURE 7 is a fragmentary vertical sectional view, mostly in elevation and with parts broken away, taken substantially along line 7—7 in FIGURE 6;

FIGURE 8 is a view similar to FIGURE 6 showing how the point of the blade being sharpened is supported and also showing additional wing blocks adjustably secured to wing portions of the blade rest to assist in supporting very small blades as they are being ground;

FIGURE 9 is a fragmentary vertical sectional view, mostly in elevation, taken substantially along line 9—9 in FIGURE 8; and FIGURE 10 is another fragmentary plan view similar to FIGURE 8, showing still another form of auxiliary guide plate adjustably secured to one of the wing portions of the blade rest for sharpening very short blades such as are associated with fingernail clippers.

Figure 1:
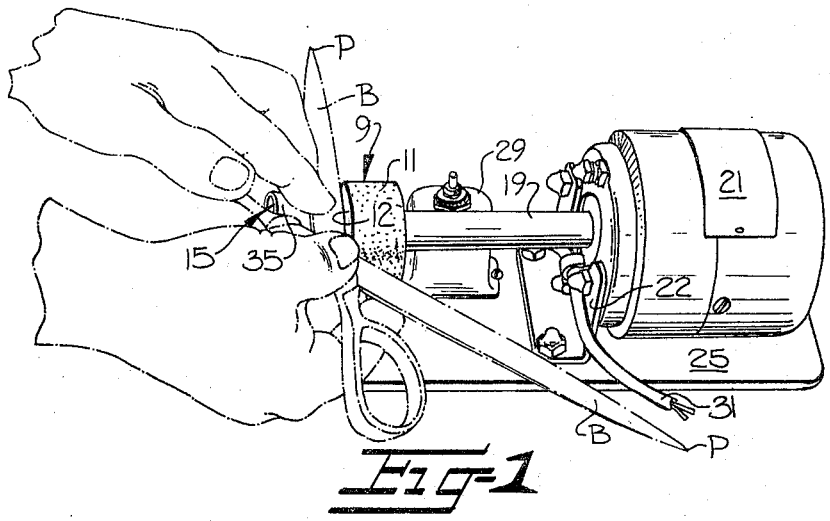
FIGURE 1 is a perspective view of a preferred embodiment of the grinding apparatus of the present invention, showing the same in association with a blade in the hands of an operator.
Figure 2:
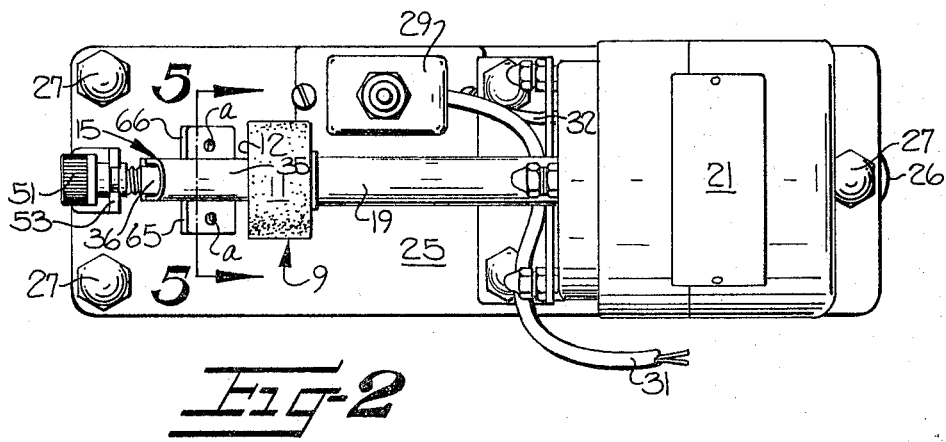
FIGURE 2 is an enlarged top plan view of the apparatus shown in FIGURE 1.

Referring more specifically to the drawings, the apparatus of the present invention comprises a cup-type abrading or grinding wheel 9 including an annular outer portion 11 having an abrasive outer end face 12 defining a cavity 13 substantially axially located therein. Outer end face 12 lies in a plane substantially perpendicular to the axis of rotation of grinding wheel 9. One end portion of a novel elongate blade rest, broadly designated at 15, is positioned within cavity 13. Blade rest 15 is supported in a manner to be later described so that relative angular and longitudinal adjustment may be effected between grinding wheel 9 and blade rest 15. Although the grinding wheel 9 may occupy any desired position, it is shown with its axis extending horizontally, in which position it would normally be used and for convenience in describing the apparatus.

Grinding wheel 9 is fixed on the front end of a substantially horizontal motor shaft 19 of an electric motor 21 suitably secured, as by a bracket 22, to a plate or base 25. Base 25 has suitable legs 26 thereon adapted to rest upon a work bench, table or the like. Base 25 may be suitably secured to the work bench by screws or bolts 27 penetrating base 25 and legs 26.

A suitable manual switch 29 is suitably secured to the upper surface of base 25, adjacent one side of shaft 19, and serves, when closed, to direct electrical energy from a suitable source, not shown, through conductors 31, 32 to electric motor 21.

The elongate blade rest 15 is provided with an upper, blade guiding surface 35 which preferably extends throughout the length of blade rest 15. Blade guiding surface 35 extends parallel to and is convexly curved about an imaginary straight line which intersects and forms an acute angle with the plane defined by outer end face 12 of grinding wheel 9. Preferably the radius of curvature of surface 35 is somewhat greater than the radius of the wall of cavity 13 in grinding wheel 9. Notwithstanding this preference it should be recognized that the radius of curvature of surface 35 may be quite small and yet still perform the implicit function of this invention. Such a construction is intended to be included herein within the meaning of the term "convexly curved."

The surface 35 and end face 12 define opposing sides of a blade receiving pocket (see especially FIGURES 1, 2, 7 and 9). These sides form an acute included angle, the value of which may be adjusted by angular adjustment of rest 15, as discussed in more detail hereinbelow. A blade B to be sharpened is positioned in said pocket with one side thereof in line contact with the convex guiding surface 35. Blade B may then be manually slid along this line of contact until another side of the blade, namely the side to be ground, contacts end face 12 of the grinding wheel 9 at two points of contact, as illustrated (see FIGURES 1, 5 and 6). The angle between the sides of blade B is thus controlled by the setting of blade rest 15 relative to end face 12, i.e., by the value of the included angle of the aforesaid pocket. Because surface 35 is convex as stated, blade B may be rocked about an axis parallel to the line of its contact with surface 35, i.e., about the imaginary line aforementioned. Such rocking permits the angle between the blade sides to be preserved without incurring significant danger of gouging the blade, as may happen in the prior art. Additionally, end face 12 itself functions as a reference stop to limit inward travel of the blade. The arrangement accordingly does not require the nuisance and inconvenience of a separately adjustable reference stop. Blade rest 15 is substantially channel-shaped or of inverted U-shape in cross-section (FIGURE 5) and its rear portion, adjacent the annular end face 12 of grinding wheel 9, is pivotally connected to the corresponding rear portion of a support block or arm 36, as by means of a pivot pin 37 extending through the side flanges of blade rest 15 and block 36.

It should be noted that pivot pin 37 extends substantially laterally with respect to the longitudinal axis of grinding wheel 9 and shaft 19 and should be located as close as possible to the blade guide surface 35. It is important to note that arm 36 and rest 15 are so arranged that rest 15 and its blade guiding surface 35 extend outwardly from within cavity 13 and generally axially of the grinding wheel. Thus, when in use, blade guiding surface extends outwardly from cavity 13 at an acute angle with respect to those portions of annular end face 12 engaged by the beveled edge of a blade being moved manually across and against guiding surface 35, as is important in sharpening obliquely beveled edges of shears and the like.

Support arm 36 is a part of a substantially C-shaped bracket, broadly designated at 40, and including a substantially vertical or web portion 41 and a lower arm 42. Lower arm 42 of bracket 40 rests upon base 25 and has a relatively narrow longitudinally extending projection or key portion 43 on the bottom thereof guided for longitudinal adjustment in an elongate slot 44 (FIGURE 7) extending through a front portion of base 25.

The lower arm 42 of bracket 40 is yieldably maintained in engagement with the upper surface of base 25 by a screw 45, the stem of which loosely extends through a compression spring 46, a washer 47 and the lower arm 42 of bracket 40, and has a nut 50 threadedly mounted on the upper end thereof and engaging the upper surface of arm 42. The head of screw 45 bears against one end of compression spring 46 and the other end of compression spring 46 bears against washer 47, thus yieldably urging washer 47 against the lower surface of base 25 to yieldably maintain lower arm 42 of bracket 40 in engagement with the upper surface of base 25.

Means are provided for imparting fine longitudinal adjustment to bracket 40 to thereby effect relative longitudinal adjustment between grinding wheel 9 and blade rest 15. To this end, a longitudinal adjustment screw 51 is threaded through the web portion 41 of bracket 40 and its front portion is provided with an annular groove 52 therein which is engaged by the concave upper portion of a yoke 53 suitably secured, as by a screw 54, to the front upper surface of base 25.

Figure 3:
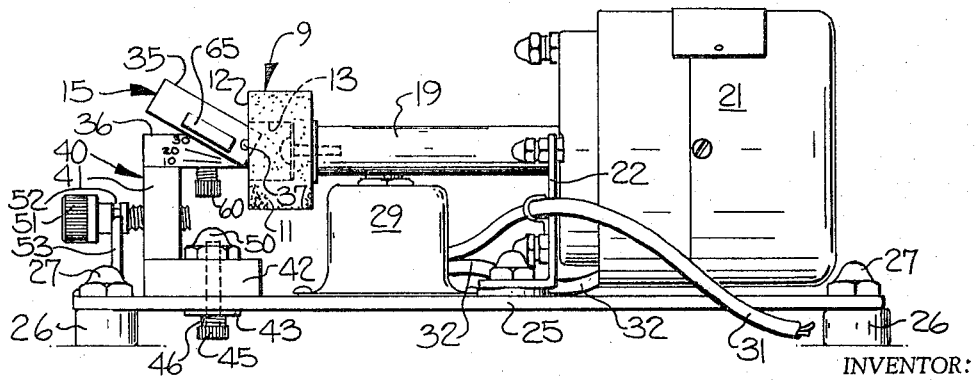
FIGURE 3 is a side elevation of the apparatus.

It will be noted that the rear portions of blade rest 15 and the upper arm 36 of bracket 40 are substantially smaller than the diameter of cavity 13 so that they may be moved inwardly and outwardly with respect to cavity 13 and, also, so that blade rest 15 may be angularly adjusted about pivot pin 37. Either or both sides of the upper arm 36 of bracket 40 may be provided with suitable indicia or may be suitably graduated with properly identified angular lines to assist an operator in accurately determining the angle at which the convex upper surface 35 of blade rest 15 extends relative to the annular end face 12 of grinding wheel 9. The aforementioned graduation lines are identified by the numerals 10, 20 and 30 in FIGURES 3, 7 and 9, it being understood that, when the lower edge of the coresponding side flange of blade rest 15 is alined with the graduation lines, the corresponding numeral 10, 20 or 30 indicates the angle in degrees at which the convex upper surface 35 of blade rest 15 extends relative to the longitudinal axis of grinding wheel 9 and shaft 19.

In order to effect the desired fine angular adjustment of blade rest 15 relative to grinding wheel 9, the lower surface of the upper wall or web portion of blade rest 15 is engaged, at a medial portion thereof, by the rounded upper end of an angular adjustment screw 60 which threadedly penetrates the upper arm 36 of bracket 40, and the head of which is spaced below the lower surface of arm 36 and engages the lower end of a compression spring 61. The upper end of compression spring 61 engages the lower surface of arm 36, thus yieldably maintaining adjustment screw 60 and blade rest 15 in the desired adjusted position. If so desired, the heads of screws 45, 51, 60 may be suitably knurled or serrated, since the springs 46, 61 enable longitudinal and angular adjustment of blade rest 15 relative to grinding wheel 9 simply by manually turning the corresponding screws without the use of tools of any kind.

The adjustment means heretofore described, including screws 51, 60 permits easy adjustment of the angularity of the convex upper surface 35 of blade rest 15 relative to the front end face 12 of grinding wheel 9 in accordance with the angle at which the blade, such as B in FIGURES 5, 6 and 7, may have been originally manufactured, while permitting the proximal portions of the inner peripheral edge of the annular outer face 12 of grinding wheel 9 and the convex upper surface 35 of blade rest 15 to be positioned in very close proximity to each other without engaging each other. This is desirable so that the point of a blade, such as the point P in FIGURES 1, 5 and 6, is prevented from entering cavity 13 as blade B is manually drawn across the convex upper surface 35 of blade guide 15 and against the upper portion of the rotating annular outer face 12 of grinding wheel 9. It is apparent that this eliminates the possibility of the blade suddenly being deflected as it is drawn across blade rest 15 to such extend as to cause the inner peripheral edge of the annular outer face of grinding wheel 9 to grind an undesirable groove in the edge of the blade B being sharpened or ground.

The upper surface of blade rest 15 is convexly curved in the aforementioned manner for two very important reasons. First, in the grinding of the edges of relatively long or heavy blades, the convex surface 35 permits the operator to rock the blade, as is natural, longitudinally of the corresponding blade (laterally of the grinding wheel 9) without materially changing the angle at which the corresponding substantially laterally opposed portions of the annular outer end face of the grinding wheel 9 may be grinding the corresponding portions of the blade B. On the other hand, if the blade rest 15 had a flat upper surface or a concave upper surface, its opposed side edges, being offset or eccentrically located with respect to the plane of the longitudinal axis of grinding wheel 9, would cause the blade to move upwardly to a substantially greater extent at its portion remote from the edge about which the blade may be pivoted than would be the case if the blade rest 15 was provided with the convex upper surface 35 according to the present invention, with the result that the raised portion of the blade would be ground excessively and might have an undesirable groove formed therein, notwithstanding the fact that the oblique angle of the blade would be varied from one portion thereof to another to a substantial extent.

In an exemplary apparatus according to this invention, the grinding wheel 9 had an external diameter of one and three-fourths inches, cavity 13 was seven-eighths of an inch in diameter, blade guide surface 35 had a radius of about five-eighths of an inch, and the width of blade rest was about five-eighths of an inch. Also, the longitudinal edges of surface 35 at the flanges of blade rest 15 were rounded on a radius of about one-sixteenth of an inch. This relationship between the radii of the wall of cavity 13 and surface 35 and the width of blade rest 15 is desirable in order that the entire width of surface 35 may be maintained in close proximity to the inner edge of annular end surface 12 of grinding wheel 9 throughout angular adjustment of blade rest 15 between 0° and about 45° relative to the longitudinal axis of wheel 9 and shaft 19.

In other words, the radius of cavity 13 should be about 70% of the radius of surface 35, and the width of surface 35 should be about the same as its radius. The curvature of surface 35 thus avoids an abrupt change in the attitude of a blade being sharpened when it is rocked longitudinally from one position to another while being drawn manually and in a substantially horizontal position across the upper surface 35 of blade rest 15. Of course, surface 35 must be of lesser width than the diameter of cavity 13 so arm 36 and rest 15 may be adjusted inwardly and outwardly relative to cavity 13.

Although the radius of blade guide surface 35 may be greater than five-eighths of an inch, this radius is optimum for use with a grinding wheel having a seven-eighths inch diameter cavity 13 and insures that known commercial scissors having longitudinally curved or concavo-convex blades will not be spaced above the central portion of surface 35 while being supported against the opposed longitudinal side edges of surface 35.

Since the present blade sharpening apparatus is devised for use in sharpening blades of various types, sizes and lengths, in order to sharpen relatively small blades such as are shown in B' on the scissors of FIGURE 8, the lower portions of blade rest 15 may be provided with laterally extending wing portions 65, 66 whose rear edges are spaced a substantial distance forwardly from the rearmost end of blade rest 15 so they will not interfere with angular and longitudinal adjustment of blade rest 15. The upper surfaces of wing portions 65, 66 are spaced a substantial distance below the convex upper surface 35 of blade rest 15 so they will not interfere with the rocking of a relatively large blade being sharpened as it is rocked in a normal manner in the hands of an operator as shown in FIGURE 1.

Each wing portion 65, 66 may have a threaded hole $a$ therethrough to facilitate adjustably securing an auxiliary blade rest plate or extension to the upper surface of either or both wing portions 65, 66. Both wing portions 65, 66 are shown in FIGURE 8 with corresponding auxiliary blade rest plates $b$, $c$ adjustably secured thereto by respective screws $d$, $e$. Screws $d$, $e$ penetrate respective longitudinally extending adjustment slots $f$, $g$ in plates $b$, $c$ and are threaded into the corresponding holes $a$ in wing portions 65, 66.

The side edges of plates $b$, $c$ are preferably rounded, as at 67, 68, to permit some tilting of a corresponding blade B' as it is being sharpened or ground. It is apparent that a relatively small blade, such as blades B' of FIGURE 8, may be controlled more easily by an operator than a relatively large blade, such as indicated at B in FIGURES 1, 5 and 6, so there is less tendency for the operator to tilt or rock the small blade B' being sharpened than is the case with respect to the larger blade B. Thus, the upper surfaces of the auxiliary blade rests or extensions $b$, $c$ may be substantially flush with the uppermost portion of the convex surface 35 of main blade rest 15.

The reason why the auxiliary blade rests $b$, $c$ are adjustable longitudinally with respect to blade rest 15 is so that they may be positioned in very close proximity to the face 12 of grinding wheel 9, regardless of the angle at which blade rest 15 may be adjusted within its limits. It is apparent that, the steeper the angle at which blade rest 15 is adjusted, the further the auxiliary blade rests $b$, $c$ would have to be adjusted forwardly or away from the pivot pin 37 so that the grinding wheel 9 would not actually contact the rearmost edges of auxiliary blade rests $b$, $c$. Conversely, the shallower the angle at which main blade rest 15 is adjusted, the closer may the auxiliary blade rests $b$, $c$ be adjusted toward the rear end of main blade rest 15.

Even if the blade rest 15 were to remain in a predetermined angularly adjusted position, while sharpening many blades therewith, the wearing of the front annular end face 12 of grinding wheel 9 may be compensated for simply by turning adjustment screw 52 to move the upper surface 35 of blade rest 15 into close proximity to the inner periphery of the face 12 of grinding wheel 9.

Referring to FIGURE 10, a modified form of auxiliary blade rest is shown which is particularly devised for use in sharpening the pointed ends of very small or very short blades, such as fingernail clipper blades. In this instance, the modified form of auxiliary blade rest is indicated at $b'$ and is generally constructed and adjustably secured to the corresponding wing portion 65 of blade rest 15 in the same manner as the blade rests $b$, $c$ of FIGURES 8 and 10. Accordingly, details of the manner in which the modified form of auxiliary blade rest $b'$ is attached to the wing portion 65 will not be given.

Blade rest $b'$ differs from blade rest $b$, for example, in that it is somewhat wider than auxiliary blade rest $b$. In other words, auxiliary blade rest $b'$ extends outwardly from blade rest 15 to a substantially greater extent than auxiliary blade rest $b$ so that its outer surface, remote from main blade rest 15, is positioned outwardly of the plane of the periphery of grinding wheel 9. Since the blade being sharpened must be supported even at the very tip of the pointed end thereof during sharpening and the modified form of auxiliary blade rest $b'$ must be adjustable longitudinally of main blade rest 15 for the reasons given heretofore, the outer portion of modified auxiliary blade rest $b'$ has a rearwardly extending projection or finger 75 thereon, a portion of which is positioned within the radial plane of a portion of the periphery of grinding wheel 9 at all times, thus preventing the point of an extremely small blade from being pulled downwardly by its frictional engagement with the end face 12 of grinding wheel 9 between said end face and the proximal edge of modified auxiliary blade rest $b'$.

It should be noted that, in order to replace grinding wheel 9, it is only necessary to turn adjustment screw 51 sufficiently to withdraw the corresponding ends of blade rest 15 and arm 36 from cavity 13 of grinding wheel 9, and then to remove grinding wheel 9 from the end of shaft 19. Further, the cup-shaped form of the grinding wheel 9 is self-leveling, to the extent that successive blades being sharpened may be in engagement with only a narrow radial portion of the wheel of the face 12 of grinding wheel 9 at any given instant, but rotation of the annular face 12 insures that the entire face is always contacted by any blades, unless they be extremely small blades, during the grinding of the same.

Further, since the radius of the convex surface 35 of blade rest 15 is desirably substantially greater than the radius of wheel of the inner periphery of annular face 12 of grinding wheel 9, the uppermost surface of surface 35 is always spaced a relatively small distance below the adjacent inner wall of cavity 13, thereby providing a three-point support for the blade being sharpened and which further assists the operator in properly manipulating the blade as it is drawn across blade rest 15. In other words, the blade being sharpened, such as blade B for example, bears against face 12 and extends tangent to the periphery of the convex surface 35 of blade rest 15 in line contact at therewith while it also engages two opposed points on the face 12, which opposed points are defined by the relatively small space between laterally opposed portions of the face 12 of grinding wheel 9 straddling cavity 13.

In the drawings and specificattion there has been set forth a preferred embodiment of the invention and, although specific terms are employed, they are used in a generic and descriptive sense only, and not for purposes of limitation, the scope of the invention being defined in the claims.

I claim:

1. Apparatus for sharpening elongate beveled edges of blades, such as scissors blades and the like, comprising a driven grinding wheel rotatable about an axis and having an annular portion with an outer end face lying in a plane substantially perpendicular to said axis, said portion having a cavity substantially axially located therein, a blade rest having end portions, means supporting said rest with one end portion thereof positioned within said cavity, said rest having a blade guiding surface etxending outwardly and generally axially of said grinding wheel, said surface also extending parallel to and being convexly curved about an imaginary straight line intersecting said end face plane of the grinding wheel at an acute angle, a blade receiving pocket of acute included angle being accordingly defined on one side by said convex blade guiding surface and on another side by proximal portions of said end face of the grinding wheel such that one side of a blade positioned in said pocket for sharpening makes line contact with said convex upper guiding surface and is accordingly supported thereby for rocking motion about said straight line and for sliding motion along said line of contact, and another side of said blade makes contact with said end face, with said end face serving as a stop to limit inward movement of said blade along said line of contact during sharpening thereof, and an auxiliary blade rest adjustably secured to at least one side of said blade rest with its surface being substantially flat and alined with the blade guiding surface of said first-named rest.

2. Apparatus according to claim 1, wherein said supporting means includes means to adjust said rest about an axis extending substantially laterally of the axis of rotation of, and located adjacent said end face of, said grinding wheel, thereby to adjust said included angle of said blade-receiving pocket.

3. Apparatus according to claim 2, including means for effecting relative longitudinal adjustment between said grinding wheel and said blade rest substantially parallel with the axis of said grinding wheel.

4. A structure according to claim 1, wherein said convex guiding surface is of greater radius and greater width than the radius of said cavity.

5. A structure according to claim 1, wherein said auxiliary rest extends outwardly beyond the plane of the periphery of said grinding wheel, and a projection on the outer end of said auxiliary rest extending therefrom past and substantially radially of at least a portion of the periphery of said wheel.

6. A blade sharpening apparatus comprising a base, a motor on said base and having a substantially horizontal rotary shaft thereon, a cup-shaped grinding wheel fixed on the end of said shaft remote from said motor, said wheel having an outer end face lying in a plane substantially perpendicular to said shaft, a cavity in said wheel extending generally axially of said shaft from said outer end face, a blade rest support bracket guided on said base for movement substantially parallel to said shaft and having an arm thereon movable partially into and out of said cavity, a substantially channel-shaped blade rest having a blade guiding surface, said surface being convexly curved about a line intersecting said plane at an acute angle, said rest having side flanges depending from said surface, said rest being adapted to straddle said arm and to be moved partially into and out of said cavity with said arm, means pivotally connecting said flanges to said arm and adjacent said wheel for pivotal adjustment of said rest about a substantially horizontal and lateral axis relative to said wheel, manually operble means for angularly adjusting said rest about said axis to vary said acute angle, and manually operble means for adjusting said bracket substantially parallel to said shaft to thereby enable positioning the upper surface of said rest, when angularly adjusted, close to the end of said wheel with the lower end of said rest within said cavity.

7. A structure according to claim 6, wherein said means for adjusting said rest about said axis comprises a screw threaded substantially vertically through said arm and having its upper end engageable with said rest.

8. A structure according to claim 6, wherein said means for adjusting said bracket comprises a screw threaded substantially horizontally into said bracket and extending outwardly therefrom in a direction away from said motor, said screw having a peripheral groove in its outer portion, and a yoke fixed to said base and engaging said groove whereby rotating said screw imparts corresponding movement to said bracket substantially parallel with said shaft.

9. Apparatus for sharpening elongate beveled edges of blades, such as scissors blades and the like, comprising a driven grinding wheel rotatable about an axis and having an annular portion with an outer end face lying in a plane substantially perpendicular to said axis, said portion having a cavity substantially axially located therein, a blade rest having end portions, means supporting said rest with one end portion thereof positioned within said cavity, said rest having a blade guiding surface extending outwardly and generally axially of said grinding wheel, said surface also extending parallel to and being convexly curved about an imaginary straight line intersecting said end face plane of the grinding wheel at an acute angle, a blade receiving pocket of acute included angle being accordingly defined on one side by said convex blade guiding surface and on another side by proximal portions of said end face of the grinding wheel such that one side of a blade positioned in said pocket for sharpening makes line contact with said convex upper guiding surface and is accordingly supported thereby for rocking motion about said stright line and for sliding motion along said line of contact, and another side of said blade makes contact with said end face, with said end face serving as a stop to limit inward movement of said blade along said line of contact during sharpening thereof, a wing portion on at least one side of said rest and having its upper surface spaced below the blade guiding surface of said rest, and an auxiliary blade rest adjustably secured to the upper surface of said wing portion, with the upper surface of said auxiliary rest being substantially flat and alined with the blade guiding surface of said first-named rest.

References Cited by the Examiner

UNITED STATES PATENTS

| | | | |
|---|---|---|---|
| 926,101 | 6/1909 | Connet | 51—128 |
| 961,554 | 6/1910 | Sweet | 51—128 |
| 1,068,973 | 7/1913 | Brown | 51—128 |
| 1,092,877 | 4/1914 | Wallace | 51—210 |
| 1,398,741 | 11/1921 | Rose | 51—210 |
| 2,318,764 | 5/1943 | Dorris | 51—128 |
| 2,433,512 | 12/1947 | Gorn | 51—128 |
| 2,477,484 | 7/1949 | Hunt | 51—128 |
| 2,673,426 | 3/1954 | Speare | 51—210 |

FOREIGN PATENTS

| | | |
|---|---|---|
| 121,256 | 3/1946 | Australia. |
| 201,338 | 8/1923 | Great Britain. |

References Cited by the Applicant

UNITED STATES PATENTS

| | | |
|---|---|---|
| 2,751,721 | 6/1956 | Smith. |
| 3,078,622 | 2/1963 | Spitaleri et al. |

HAROLD D. WHITEHEAD, *Primary Examiner.*